May 27, 1924.
E. HOLMES
1,495,306
DRAFT DEVICE FOR VEHICLES
Filed Feb. 14, 1919  2 Sheets-Sheet 1
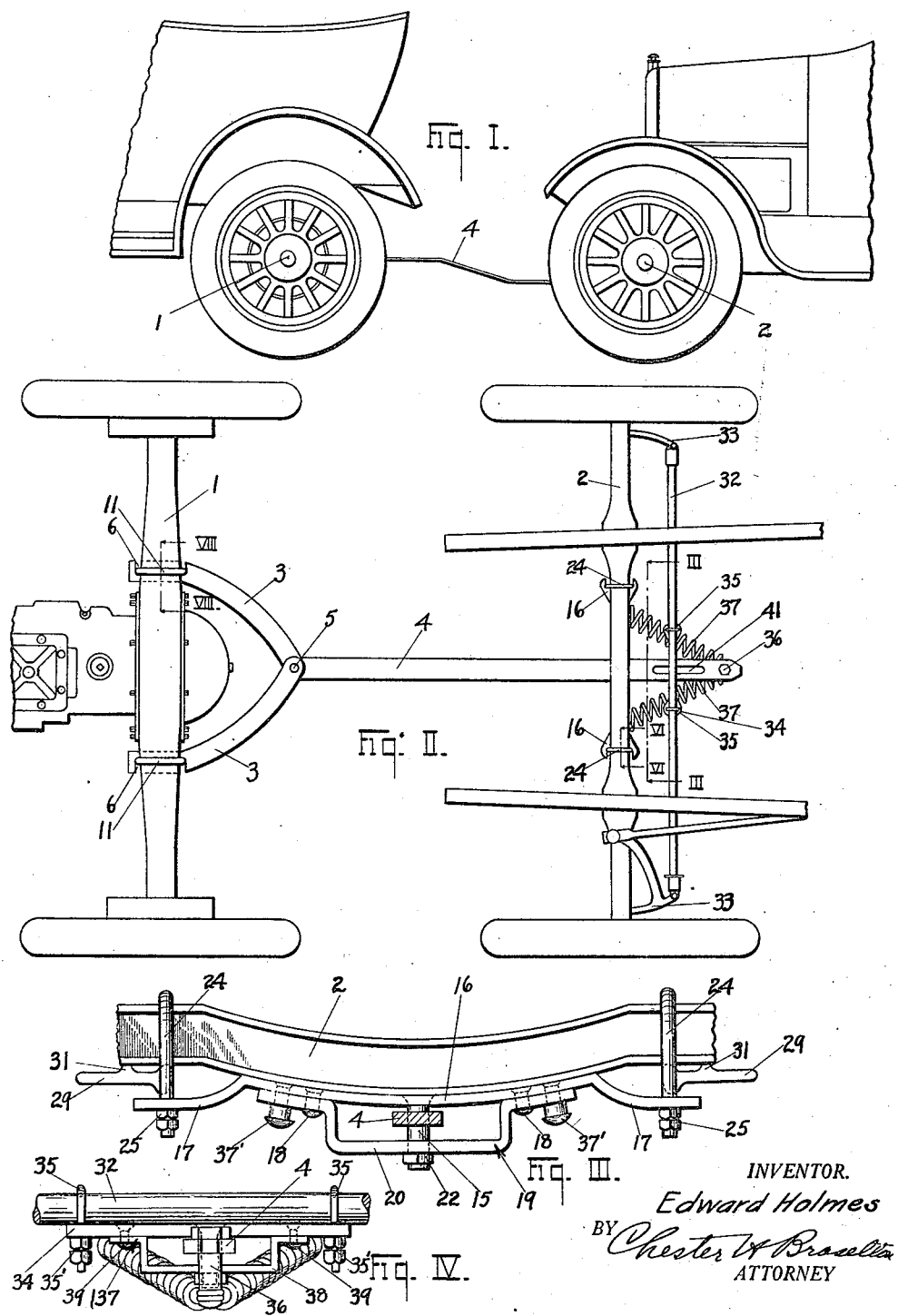
INVENTOR.
Edward Holmes
BY Chester W Broselton
ATTORNEY

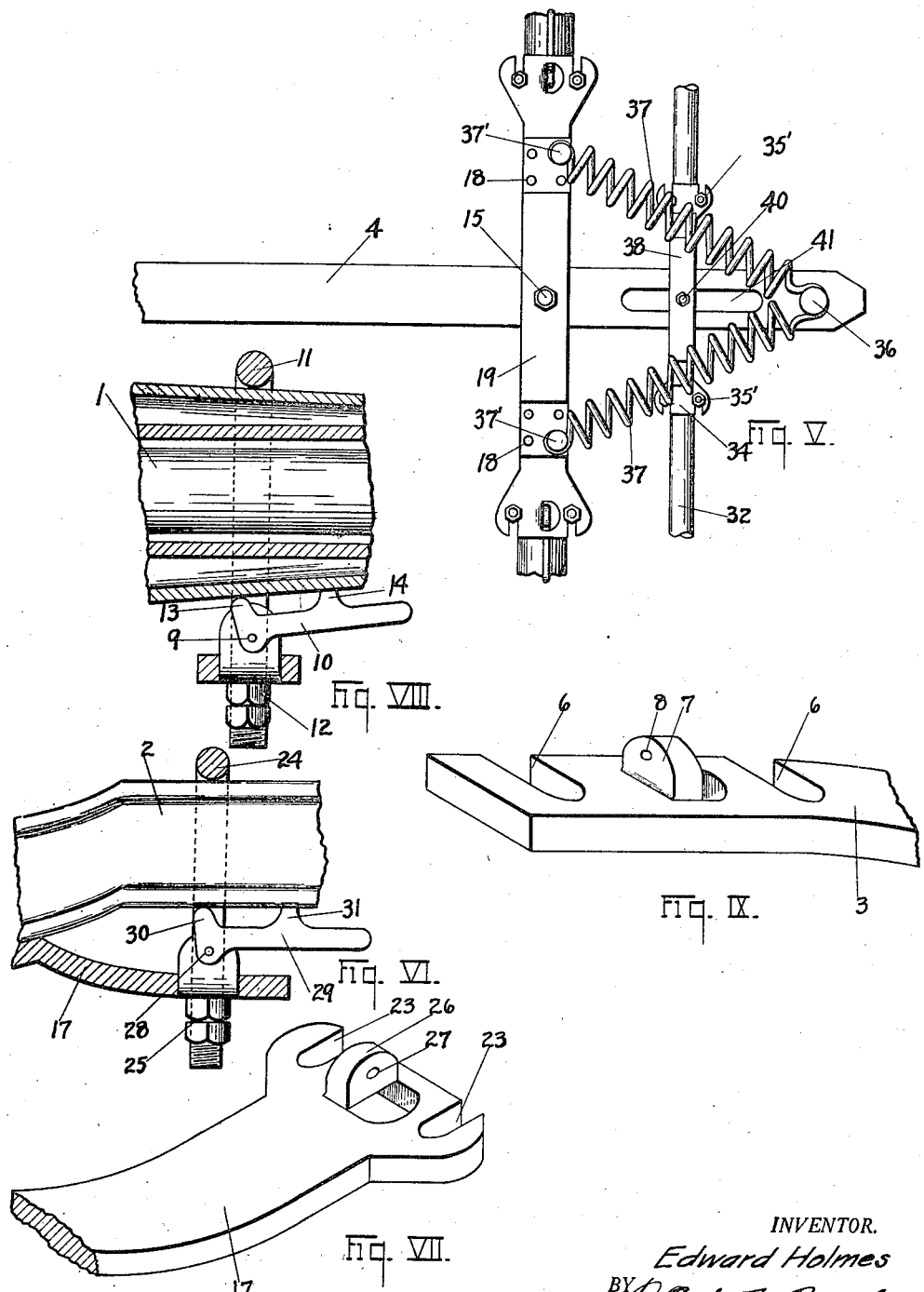

Patented May 27, 1924.

1,495,306

UNITED STATES PATENT OFFICE.

EDWARD HOLMES, OF TOLEDO, OHIO, ASSIGNOR TO THE WILLYS-OVERLAND COMPANY, OF TOLEDO, OHIO, A CORPORATION OF OHIO.

DRAFT DEVICE FOR VEHICLES.

Application filed February 14, 1919. Serial No. 277,020.

*To all whom it may concern:*

Be it known that I, EDWARD HOLMES, residing at Toledo, in the county of Lucas and State of Ohio, have invented certain new and useful Improvements in Draft Devices for Vehicles, of which I declare the following to be a full, clear, and exact description.

My invention relates to an improved draft device for vehicles, whereby a series of vehicles may be connected together and drawn forwardly by a single motor propelled vehicle.

One object of my invention is to provide a device of the character described which may be readily applied to and removed from automobiles of various types, and which will operate effectively to connect the same in such a manner that they will properly track while being drawn forwardly upon the road.

A further object of my invention is to provide a device of the character described which is of simple construction, and may be folded in such a manner as to occupy a small space when not in use, and therefore admit of being readily transported from place to place.

A further object of my invention is to provide a device of this character which will operate to properly control the front steering wheels of an automobile when the same is to be drawn as a trailer.

Further objects of this invention relate to economies of manufacture and details of construction as will hereinafter appear from the detailed description to follow.

I accomplished the objects of my invention in one instance by the devices and means described in the following specification, but it is evident that the same may be varied widely without departing from the scope of the invention as pointed out in the appended claims.

A structure constituting one embodiment of my invention, which may be the preferred, is illustrated in the accompanying drawing forming a part thereof, in which:

Figure I is a side elevation of my improved draft device, showing it applied to two automobiles, when one of the automobiles is to be drawn as a trailer.

Figure II is a top plan view of the device as applied to automobiles, the body portions of the automobiles being removed to better illustrate the manner of connecting the draft mechanism to the axles.

Figure III is a side elevation of the front axle of the trailer taken along the line III—III of Figure II, and showing the manner of connecting the draft device to the front axle.

Figure IV is a rear elevation of the rod for connecting the steering knuckles, and showing the mechanism for connecting the draft device thereto.

Figure V is a bottom plan view showing the manner of connecting the draft mechanism to the front axle and steering rod of the rear automobile.

Figure VI is a vertical sectional view taken along the line VI—VI of Figure II, and illustrating the tension clamp employed for firmly securing the plate to the front axle of the rear automobile.

Figure VII is a perspective view of one end of the plate, which is applied to the front axle of the rear automobile.

Figure VIII is a vertical sectional view taken along the line VIII—VIII of Figure II, and illustrating the tension clamp employed for securing the forward arms of the draft device to the rear axle of the front automobile.

Figure IX is a perspective view of the end portion of the bowed arms forming the forward part of the draft device.

In the drawing, similar reference characters refer to corresponding parts throughout the several views, and the sectional views are taken looking in the direction of the small arrows at the ends of the section lines.

In the embodiment of the invention illustrated herewith, 1 and 2 designate the rear and forward axles of the front and rear automobile respectively; the front automobile being adapted to be employed for pulling the rear or trailer automobile. A pair of bowed arms 3 are adapted to be secured to the rear axle of the front automobile, at points upon opposite sides of the transmission casing, and to converge rearwardly, being adapted to be pivotally connected together and to the main draw bar portion 4 of the draft device at 5. The forwardly extending ends of the bowed arms 3 are each provided in their outer edges with a pair of slots 6 spaced from each other a distance which is substantially equivalent to the diameter of the usual rear axle casing at the point to which they are to be applied thereto. At a point substantially midway of these slots a lug 7 is formed upon the upper side of each plate 3, which lug is preferably formed integral with the plate and is provided with an opening 8 adapted to receive a pin 9 upon which is pivotally mounted a clamping tension lever 10. A U-bolt 11 is adapted to straddle the rear axle casing of the front automobile upon each side of the transmission casing, and have its ends pass through the slots 6 formed in the forward end of each of the bowed arms 3. Nuts 12 are threaded upon the lower free ends of the U-bolts 11 and are adapted to bear against the under surface of the forward ends of the bowed arms. Each of the clamping tension levers 10 is provided with a cam portion 13, adapted to bear against the under surface of the rear axle casing for the purpose of securely clamping the forward end of each of the bowed arms 3 securely to the casing, and each of the clamping tension levers 10 is further provided with a stop 14 adapted to strike against the lower surface of the rear axle casing to prevent excessive movement of the clamping lever in one direction.

It will be evident from this construction that the forwardly extending bowed arms 3 may be readily clamped to the rear axle casing, and upon proper movement of the clamping tension lever in one direction firmly secured in place relatively thereto; and upon movement of the clamping lever in the opposite direction the forward end of each of the bowed arms may be quickly and easily detached from the rear axle casing. The manner of securing each of the forwardly extending bowed arms 3 to the rear axle casing is as follows: One of the U-bolts is placed over the axle and the free ends of the same inserted in the slot 6 of one of the bowed arms, the nuts 12 are threaded upon the lower free ends of the U-bolt a suitable distance, when the clamping tension lever 10 is rotated into position shown in Figure VIII, thereby exerting a wedging pressure between the lower surface of the rear axle casing and the upper surface of the bowed arm in such a manner as to firmly clamp the parts together and secure them against separation until the tension exerted by the clamping lever is released. The construction and manner of operation of the mechanism for clamping each of the bowed arms to the rear axle casing is identical, and a description of one of these mechanisms will suffice for both.

The draw bar 4 extends rearwardly from its point of pivotal connection with the rear ends of the bowed arms 3, and is pivotally mounted upon a pin 15 carried by the central portion of the front axle of the rear automobile in a manner which will be presently described. A plate 16 is adapted to underlie and bear throughout a portion of its length against the under face of the front axle of the rear automobile, said plate being provided at its ends with a pair of offset portions 17 employed for the purpose of securing the plate to the front axle of the automobile. Secured to the lower surface of the plate 16 as by bolts or rivets 18 is a supplemental plate 19, provided with a depressed portion 20 for the reception of the draw bar. The king bolt 15 is mounted in the plate 16 and extends through the space enclosed between the plate 16 and the depressed portion 20 to provide a point of pivotal connection for the draw bar 4, and is held in position by a nut 22. The manner of securing the plate 16 and the associated parts carried thereby to the front axle of the rear automobile is similar to that employed for securing the bowed arms 3 to the rear axle of the front automobile. Each of the offset ends 17 of the plate 16 is provided with a pair of slots 23, spaced from each other a distance substantially equal to the width of the front axle with which they are adapted to be employed. A U-bolt 24 is adapted to straddle the front axle of the rear automobile at points which substantially concide with the ends of the plate 16, the free ends of each U-bolt being adapted to be positioned within the slots 23 formed in each end of the plates 16 and have nuts 25 threaded upon the lower extremities thereof. At a point substantially midway between the slots 23 formed in each end of the plate 16 is a lug 26, which is preferably formed integral with the plate 16, and is provided with an opening 27 formed therein which is adapted to receive a pin 28 upon which is pivotally mounted a clamping tension lever 29. The clamping tension lever 29 is provided with a cam face 30 and a stop 31, similar in all respects to the cam face 13 and stop 14 carried by the clamping tension lever 10. In applying the plate 16 to the front axle of an automobile, the U-bolts are properly positioned upon the front axle in such a manner that their free ends are positioned within the slots 23 formed in the ends of the plate, and nuts 25 are threaded upon the free ends of the U-bolt so as to bear against the under surface of the plate 16, whereupon the clamping tension levers 29 are rotated about the pins 28 into the positions illustrated in Figures III and VI whereby tension is exerted between the lower face of the front axle and the upper face of the plate 16, in such a manner as to securely retain the plate in proper position with relation to the front axle. When it is desired to detach the plate 16 from the front axle, the clamping levers 29 may be rotated in the opposite direction, thus releasing the ends of the plate from the tension applied thereto, and permitting the U-bolts to be readily removed and the plate detached from the axle.

The usual transverse steering rod 32 is positioned in the rear of the front axle and extends in a direction substantially parallel therewith, being adapted to connect the usual steering knuckles 33 for controlling the front steering wheels of the rear automobile. Secured to the lower surface of the transverse steering rod 32 is a plate 34, which is adapted to be firmly attached thereto by a pair of U-bolts 35, each of which embraces the transverse steering rod 32 and passes through openings suitably provided in the ends of the plate 34, whereupon nuts 35′ may be threaded upon the lower ends of the U-bolts for the purpose of firmly securing the plate to the under surface of the transverse steering rod. A supplemental plate 137 provided with a central depressed portion 38 which forms a recess for the reception of one end of the draw bar 4, is firmly secured to the lower face of the plate 34 by means of bolts or rivets 39. A bolt 40 is mounted in the plate 34 and the depressed portion 38 of the plate 137, being adapted to pass through the slot 41 formed in that portion of the draw bar which is positioned within the recess formed between the depressed portion 38 and the plate 34. As shown in Fig. 5, the slot 41 is materially wider than the pin 40, which allows the rod 32 to have a certain amount of free lateral movement. A depending pin 36 is secured to the rear end of the draw bar 4 and has attached thereto one end of each of a pair of coiled tension springs 37, which springs diverge forwardly therefrom and are each secured at their ends to a depending pin 37′, attached to the lower surface of the supplemental plate 19.

The springs 37 impart a constant tension upon the front steering wheels of the trailer automobile, tending to maintain the wheels in their straight ahead position and to return them to that position upon release of the turning force exerted thereupon by the draw bar. They exert a constant tension upon the draw bar, and consequently upon the transverse steering rod, tending to maintain the front steering wheels in alignment with the rear wheels of the automobile, thus constantly tending to retain the front steering wheels in such position that the car will move straight ahead. When the front automobile is turned so that the pull upon the draw bar is in an angular direction with respect to the longitudinal center of the rear automobile, the springs thus put under tension constantly tend to return the front steering wheels into position where they will be in alignment with the rear wheels of the automobile, for causing the automobile to move straight ahead.

The mechanism shown herewith is adapted to be employed when a single automobile is to be pulled behind another, or when a series of trailer vehicles is employed, the front steering wheel of each automobile, except the first being controlled by means of a draft mechanism between that automobile and the one next preceding it. It will be fully understood that the constructions herewith shown is capable of being very readily attached in position, and removed from the automobiles whenever occasion may require. As the front automobile is steered in either direction, the forward end portion of the draw bar 4 will be carried therewith, thus causing a movement of the rear end of the draw bar in opposite direction by reason of the bar being pivotally mounted upon the bolt 15, by reason of which the front steering wheels of the rear automobile will be moved in such a direction as to track behind the wheels of the front automobile. Upon completion of the turning movement of the front automobile, the direct pull exerted upon the draw bar 4 will result in turning the front steering wheels of the rear automobile in such a manner that they will track directly behind the wheels of the front automobile, while it continues its progress in a straight line. The springs 37 tend constantly to cause the front steering wheels of the rear automobile to be maintained in a line with the wheels of the front automobile, and also act to prevent the steering wheels of the rear automobile from being temporarily deflected from their course by reason of ruts or other obstructions encountered in the road-way.

While I have shown and described in considerable detail a specific embodiment of my invention, it is to be understood that this showing and description is illustrative only, and for the purpose of rendering my invention more clear, and that I do not regard the invention as limited to the details of construction illustrated or described, nor any of them, except in so far as I have included such limitation within the terms of the following claims, in which it is my intention to claim all novelty inherent in my invention broadly as well as specifically.

What I claim as new and desire to secure by Letters Patent is:

1. In a vehicle of the character described, an axle, steering wheels swivelly connected to said axle, a draw bar pivotally connected with said axle, means connected to the draw bar for controlling the movement of the steering wheels, and resilient means connected with the draw-bar in rear of the axle and tending to maintain the wheels in their straight ahead position.

2. In a vehicle of the character described, an axle, steering wheels swivelly connected to said axle, a draw bar pivotally connected with said axle, a transverse steering rod connected to the draw bar for controlling the movement of the steering wheels, and resilient means connected with the draw bar and with the axle on opposite sides of the draw-bar and tending to maintain the wheels in their straight ahead position.

3. A towing apparatus comprising a draw bar pivoted to a towing automobile, means connected to the draw bar for controlling the front steering wheels of a second automobile, and a pair of springs, each of which is secured at one end to the draw bar and at the other end to the front axle of the trailer automobile.

4. A towing apparatus comprising a bracket adapted to be clamped to the rear of an automobile, a draw bar pivoted to the bracket, a plate adapted to be clamped to the front axle of the trailer automobile, said draw bar being pivoted to said plate, means connected to the draw bar for controlling the front steering wheels of the trailer automobile, and a pair of springs, each of which is secured at one end to the draw bar and at the other end to the said plate.

5. In an automobile trailer coupling, a plate adapted to be secured to the front axle of a trailer automobile and provided with a pair of slots formed in opposite ends thereof for the reception of bolts connected with the axle, and cam lever pivotally supported by the plate at each end and adapted to be rotated into locking engagement with the axle.

6. In an automobile trailer coupling, a plate adapted to be secured to the front axle of a trailer automobile and provided with a pair of slots formed in opposite ends thereof for the reception of the ends of U-bolts embracing the axle, lugs carried by the plate intermediate the slots formed in each end thereof, and cam levers pivotally supported by the lugs at each end of the plate and adapted to be rotated into locking engagement with the axle.

7. In an automobile trailer coupling, a plate adapted to be secured to the front axle of a trailer automobile and provided with a pair of slots formed in opposite ends thereof for the reception of bolts connected with the axle, cam levers pivotally supported by the plate at each end and adapted to be rotated into locking engagement with the axle, a draw bar pivotally supported by the plate, and means pivotally connected to the draw bar for controlling the movement of the front steering wheels of the trailer automobile.

8. In an automobile trailer coupling, a plate adapted to be secured to the front axle of the trailer automobile, a drawbar supported by the plate, means connected pivotally with the drawbar for controlling the movements of the steering wheels of the trailer automobile, and means for detachably clamping the plate to the front axle of the trailer automobile, including a U-bolt embracing the axle and adjustable upon the plate, and a cam lever pivoted upon the plate and adapted to bear against the axle, said U-bolt being separable from the plate without the removal of its nuts.

In testimony whereof, I affix my signature.

EDWARD HOLMES.